United States Patent
Wuidart et al.

(10) Patent No.: US 6,650,226 B1
(45) Date of Patent: Nov. 18, 2003

(54) DETECTION, BY AN ELECTROMAGNETIC TRANSPONDER READER, OF THE DISTANCE SEPARATING IT FROM A TRANSPONDER

(75) Inventors: Luc Wuidart, Pourrieres (FR); Michel Bardouillet, Rousset (FR); Jean-Pierre Enguent, Saint Savournin (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/544,151

(22) Filed: Apr. 6, 2000

(30) Foreign Application Priority Data

Apr. 7, 1999 (FR) .......................................... 99 04545
May 31, 1999 (FR) .......................................... 99 07024

(51) Int. Cl.[7] .............................................. H04Q 5/22
(52) U.S. Cl. .................. 340/10.1; 340/10.34; 340/10.4; 340/572.1; 340/572.7; 340/870.31; 340/235; 340/439; 340/492; 340/455; 340/41
(58) Field of Search ............................ 340/10.1, 10.34, 340/10.4, 572.1, 572.7, 870.31; 235/439, 492; 455/41

(56) References Cited

U.S. PATENT DOCUMENTS

| | | |
|---|---|---|
| 2,411,555 A | 11/1946 | Rogers |
| 3,618,089 A | 11/1971 | Moran, Jr. et al. |
| 4,068,232 A | 1/1978 | Meyers et al. |
| 4,209,783 A | 6/1980 | Ohyama et al. |
| 4,278,977 A | 7/1981 | Nossen |
| 4,408,185 A | 10/1983 | Rasmussen |
| 4,593,412 A | 6/1986 | Jacob |
| 4,656,472 A | 4/1987 | Walton |
| 4,660,192 A | 4/1987 | Pomatto, Sr. |
| 4,706,050 A | 11/1987 | Andrews |
| 4,782,308 A | 11/1988 | Trobec et al. |
| 4,802,080 A | 1/1989 | Bossi et al. |
| 4,814,595 A | 3/1989 | Gilboa |
| 4,827,266 A | 5/1989 | Sato et al. |

(List continued on next page.)

FOREIGN PATENT DOCUMENTS

| | | | |
|---|---|---|---|
| DE | 28 35 549 A1 | 3/1979 | |
| DE | 44 44 984 | 12/1994 | |
| DE | A-195 46 928 | 6/1997 | ............. H03J/5/00 |
| DE | A-196 21 076 | 11/1997 | ........... G08C/17/04 |
| DE | 196 32 282 A1 | 2/1998 | |

(List continued on next page.)

OTHER PUBLICATIONS

French Search Report from French Patent Application 99 04548, filed Apr. 7, 1999.
French Search Report from French Patent Application 99 04545, filed Apr. 7, 1999.
French Search Report from French Patent Application 99 07024, filed May 31, 1999.
French Search Report from French Patent Application No. 99 09563, filed Jul. 20, 1999.
French Search Report from French Patent Application No. 98 08025, filed Jun. 22, 1998.

(List continued on next page.)

*Primary Examiner*—Michael Horabik
*Assistant Examiner*—Yves DaLencourt
(74) *Attorney, Agent, or Firm*—Wolf, Greenfield & Sacks, P.C.; James H. Morris

(57) ABSTRACT

A terminal for generating an electromagnetic field adapted to cooperate with at least one transponder when the transponder enters the electromagnetic field, the terminal including circuitry for determining the distance separating the at least one transponder from the terminal without requiring any transmission from the transponder to the terminal. In one example, the terminal also includes a phase regulation loop that regulates the phase of a signal in an oscillating circuit of the terminal with respect to a reference value.

20 Claims, 5 Drawing Sheets

U.S. PATENT DOCUMENTS

| | | | |
|---|---|---|---|
| 4,928,108 A | 5/1990 | Kropielnicki et al. | |
| 4,963,887 A | 10/1990 | Kawashima et al. | |
| 5,013,898 A | 5/1991 | Glasspool | |
| 5,055,853 A | 10/1991 | Garnier | |
| 5,099,227 A | 3/1992 | Geiszler et al. | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |
| 5,305,008 A | 4/1994 | Turner et al. | |
| 5,324,315 A | 6/1994 | Grevious | |
| 5,452,344 A | 9/1995 | Larson | |
| 5,493,267 A | 2/1996 | Ahlse et al. | |
| 5,504,485 A | 4/1996 | Landt et al. | |
| 5,521,602 A | 5/1996 | Carroll et al. | |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A * | 12/1997 | Yamaguchi | 235/492 |
| 5,701,121 A * | 12/1997 | Murdoch | 340/10.34 |
| 5,703,573 A | 12/1997 | Fujimoto et al. | 340/825.54 |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflugl et al. | |
| 6,034,640 A | 3/2000 | Oida et al. | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A | 8/2000 | Frary | |
| 6,137,411 A | 10/2000 | Tyren | |
| 6,154,635 A | 11/2000 | Ohta | |
| 6,172,608 B1 * | 1/2001 | Cole | 340/572.1 |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,307,468 B1 | 10/2001 | Ward, Jr. | |
| 6,307,517 B1 | 10/2001 | Lee | |
| 6,393,045 B1 | 5/2002 | Belcher et al. | |
| 6,424,820 B1 | 7/2002 | Burdick et al. | |
| 6,441,804 B1 | 8/2002 | Hsien | |
| 6,446,049 B1 | 9/2002 | Janning et al. | |
| 6,491,230 B1 | 12/2002 | Dubost et al. | |

FOREIGN PATENT DOCUMENTS

| | | | |
|---|---|---|---|
| EP | 0 038 877 | 11/1981 | |
| EP | 0 369 622 | 5/1990 | |
| EP | 0 568 067 A | 11/1993 | |
| EP | 0 579 332 A1 | 1/1994 | |
| EP | 0 645 840 A | 3/1995 | |
| EP | 0 768 540 | 4/1997 | |
| EP | A-0 857 981 | 8/1998 | G01S/13/00 |
| EP | 0 902 475 A | 3/1999 | |
| FR | 2 114 026 | 6/1972 | |
| FR | A-2 746 200 | 9/1997 | G06K/7/10 |
| FR | A-2 757 952 | 7/1998 | G01S/13/75 |
| GB | 2 298 553 A | 9/1996 | |
| GB | 2 321 726 A1 | 8/1998 | |
| JP | 407245946 A | 9/1995 | |
| JP | 10-145267 | 5/1998 | |
| JP | 10-203066 | 8/1998 | |
| WO | WO 93/17482 | 9/1993 | |
| WO | WO 98 20363 | 5/1998 | G01S/13/74 |
| WO | WO 99/33017 | 7/1999 | |
| WO | WO 99/43096 | 8/1999 | |

OTHER PUBLICATIONS

French Search Report from French Patent Application No. 99 04547, filed Apr. 7, 1999.

French Search Report from French Patent Application No. 99 04546, filed Apr. 7, 1999.

French Search Report from French Patent Application No. 98 08024, filed Jun. 22, 1998.

French Search Report from French Patent Application No. 99 04544, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04548, filed Apr. 7, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

DETECTION, BY AN ELECTROMAGNETIC TRANSPONDER READER, OF THE DISTANCE SEPARATING IT FROM A TRANSPONDER

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read/write terminal. The present invention more specifically relates to transponders having no independent power supply. Such transponders extract the power supply required by the electronic circuits included therein from the high frequency field radiated by an antenna of the read/write terminal. The present invention applies to such transponders, be they read-only transponders, that is, adapted to operating with a terminal that only reads the transponder data, or read/write transponders, which contain data that can be modified by the terminal.

The present invention more specifically relates to the detection by a transponder of the distance separating it from a terminal and, more specifically, of the transponder position with respect to a distance threshold of the terminal conditioning the system operation.

2. Discussion of the Related Art

Electromagnetic transponders are based on the use of oscillating circuits including a winding forming an antenna, on the transponder side and on the read/write unit side. These circuits are intended to be coupled by a close magnetic field when the transponder enters the field of the read/write unit. The range of a transponder system, that is, the maximum distance from the terminal at which a transponder is activated (awake) depends, especially, on the size of the transponder antenna, on the excitation frequency of the coil of the oscillating circuit generating the magnetic field, on the intensity of this excitation, and on the transponder's power consumption.

FIG. 1 very schematically shows, in a functional way, a conventional example of a system of data exchange between a read/write terminal 1 (STA) and a transponder 10 (CAR).

Generally, terminal 1 is essentially formed of an oscillating circuit formed of an inductance L1 in series with a capacitor C1 and a resistor R1, between an output terminal 2p of an amplifier or antenna coupler 3 (DRIV) and a terminal 2m at a reference potential (generally, the ground). Amplifier 3 receives a high-frequency transmission signal Tx, provided by a modulator 4 (MOD). The modulator receives a reference frequency, for example, from a quartz oscillator 5 and, if necessary, a data signal to be transmitted. In the absence of a data transmission from terminal 1 to transponder 10, signal Tx is used only as a power source to activate the transponder if said transponder enters the field. The data to be transmitted generally comes from a digital electronic system, for example, a microprocessor 6 ($\mu$P).

The connection node of capacitor C1 and inductance L1 forms, in the example shown in FIG. 1, a terminal for sampling a data signal Rx, received from a transponder 10 and intended for a demodulator 7 (DEM). An output of the demodulator communicates (if necessary via a decoder (DEC) 8) the data received from transponder 10 to microprocessor 6 of read/write terminal 1. Demodulator 7 receives, generally from oscillator 5, a clock or reference signal for a phase demodulation. The demodulation may be performed from a signal sampled between capacitor C1 and resistor R1 and not across inductance L1. Microprocessor 6 communicates (bus EXT) with different input/output (keyboard, screen, means of transmission to a provider, etc.) and/or processing circuits. The circuits of the read/write terminal draw the power necessary for their operation from a supply circuit 9 (ALIM), connected, for example, to the electric supply system.

On the side of transponder 10, an inductance L2, in parallel with a capacitor C2, forms a parallel oscillating circuit (called a reception resonant circuit) intended for capturing the magnetic field generated by series oscillating circuit L1C1 of terminal 1. The resonant circuit (L2, C2) of transponder 10 is tuned on the frequency of the oscillating circuit (L1, C1) of terminal 1.

Terminals 11, 12, of resonant circuit L2C2, which correspond to the terminals of capacitor C2, are connected to two A.C. input terminals of a rectifying bridge 13 formed, for example, of four diodes D1, D2, D3, D4. In the representation of FIG. 1, the anode of diode D1 and the cathode of diode D3 are connected to terminal 11. The anode of diode D2 and the cathode of diode D4 are connected to terminal 12. The cathodes of diodes D1 and D2 form a positive rectifier output terminal 14. The anodes of diodes D3 and D4 form a reference terminal 15 of the rectified voltage. A capacitor Ca is connected to rectified output terminals 14, 15 of bridge 13 to store power and smooth the rectified voltage provided by the bridge. It should be noted that the diode bridge may be replaced with a single-halfwave rectifying assembly.

When transponder 10 is in the field of terminal 1, a high frequency voltage is generated across resonant circuit L2C2. This voltage, rectified by bridge 13 and smoothed by capacitor Ca, provides a supply voltage to electronic circuits of the transponder via a voltage regulator 16 (REG). These circuits generally include, essentially, a microprocessor (NP) 17 (associated with a memory not shown), a demodulator 18 (DEM) of the signals that may be received from terminal 1, and a modulator 19 (MOD) for transmitting information to terminal 1. The transponder is generally synchronized by means of a clock (CLK) extracted, by a block 20, from the high-frequency signal recovered across capacitor C2 before rectification. Most often, all the electronic circuits of transponder 10 are integrated in the same chip.

To transmit data from transponder 10 to unit 1, modulator 19 controls a stage of modulation (back modulation) of resonant circuit L2C2. This modulation stage is generally formed of an electronic switch (for example, a transistor T) and of a resistor R, in series between terminals 14 and 15. Transistor T is controlled at a so-called sub-carrier frequency (for example, 847.5 kHz), much smaller (generally with a ratio of at least 10) than the frequency of the excitation signal of the oscillating circuit of terminal 1 (for example, 13.56 MHz). When switch T is closed, the oscillating circuit of the transponder is submitted to an additional damping as compared to the load formed of circuits 16, 17, 18, 19 and 20, so that the transponder draws a greater amount of power from the high frequency field. On the side of terminal 1, amplifier 3 maintains the amplitude of the high-frequency excitation signal constant. Accordingly, the power variation of the transponder translates as an amplitude and phase variation of the current in antenna L1. This variation is detected by demodulator 7 of terminal 1, which is either a phase demodulator or an amplitude demodulator. For example, in the case of a phase demodulation, the demodulator detects, in the sub-carrier half-periods where switch T of the transponder is closed, a slight phase shift (a few degrees, or even less than one degree) of the carrier of signal Rx with respect to the reference signal. The output of demodulator 7 (generally the output of a band-pass filter centered on the sub-carrier frequency) then restores an image signal of the control signal of switch T that can be decoded (by decoder 8 or directly by microprocessor 6) to restore the binary data.

It should be noted that the terminal does not transmit data when it receives some from a transponder, the data transmission occurring alternately in one direction, then in the other one (half-duplex).

FIG. 2 illustrates a conventional example of data transmission from terminal 1 to a transponder 10. This drawing shows an example of the shape of the excitation signal of antenna L1 for a transmission of a code 1011. The modulation currently used is an amplitude modulation with a 106-kbit/s rate (one bit is transmitted in approximately 9.5 is) much smaller than the frequency (for example, 13.56 MHz) of the carrier coming from oscillator 5 (period of approximately 74 ns). The amplitude modulation is performed either in all or nothing or with a modulation ratio (defined as being the difference of the peak amplitudes between the two states (0 and 1), divided by the sum of these amplitudes) smaller than one due to the need for supply of transponder 10. In the example of FIG. 2, the carrier at 13.56 MHz is modulated in amplitude, with a 106-kbit/s rate, with a modulation rate tm of 10%.

FIG. 3 illustrates a conventional example of a data transmission from transponder 10 to terminal 1. This drawing illustrates an example of the shape of the control signal of transistor T, provided by modulator 19, for a transmission of a code 1011. On the transponder side, the back modulation is generally of resistive type with a carrier (called a sub-carrier) of, for example, 847.5 kHz (period of approximately 1.18 $\mu$s). The back modulation is, for example, based on a BPSK-type (binary phase-shift keying) coding at a rate on the order of 106 kbits/s much smaller than the sub-carrier frequency.

It should be noted that, whatever the type of modulation or back modulation used (for example, amplitude, phase, frequency) and whatever the type of data coding (NRZ, NRZI, Manchester, ASK, BPSK, etc.), this modulation or back modulation is performed digitally, by jumping between two binary levels.

The oscillating circuits of the terminal and the transponder are generally tuned on the carrier frequency, that is, their resonance frequency is set on the 13.56-MHz frequency. This tuning aims at maximizing the energy diffusion to the transponder, generally, a card of credit card size integrating the different transponder components.

In some applications, it may be desired to know the distance separating the transponder from a terminal, or the transponder position with respect to a distance threshold. Such a distance detection may be used, for example, to switch the system to an operating mode or another according to whether the transponder is close (on the order of 2 to 10 cm) or very close (less than approximately 2 cm) to the reader. The notion of proximity involves the distance separating antennas L1 and L2 from each other.

Document WO-A-97/34250 provides a device of contactless information exchange with an electronic label, this device including means for preprocessing a signal representative of the distance between the label and the device, based on the signal transmitted by the label. These means are used to determine and to signal, to the information exchange device, that the information coming from the label is included in a window of predetermined values. The device described by this document uses a measurement of the amplitude of a low-frequency modulation provided by the label responsive to a read control signal sent by the device. According to this document, the amplitude of this modulation is representative of the distance separating the label from the information exchange device.

A disadvantage of this known solution is that the detection requires a demodulation of the back modulated signal transmitted by the transponder. Indeed, the detection is performed from the level of the demodulated signal, that is, of the carrier. In addition to the fact that the terminal thus cannot detect the distance of a transponder if said transponder transmits no information, the amplitude of the demodulated signal is not a monotonic function of the distance. In particular, the characteristic of the signal amplitude according to the distance generally exhibits at least one maximum in a so-called critical coupling position. The critical coupling position corresponds to the distance at which the coupling between a transponder and the terminal is optimized by a maximum remote supply amplitude received by the transponder when the oscillating circuits of the terminal are both tuned on the remote supply carrier frequency. In other words, the critical coupling position corresponds to the distance where the remote supply power is maximum for a minimum coupling factor, the coupling factor being the ratio of the mutual inductance on the square root of the product of the inductances of the oscillating circuits.

SUMMARY OF THE INVENTION

The present invention aims at providing a novel solution of distance measurement between a transponder and a terminal. In particular, the present invention aims at providing a solution that is implemented on the terminal side and that requires no transmission from the transponder to evaluate the distance.

The present invention also aims at providing a solution that enables reliable detection of the distance, independently from the transponder position with respect to the distance corresponding to the critical coupling position.

To achieve these and other objects, the present invention provides a terminal for generating an electromagnetic field adapted to cooperate with at least one transponder when said transponder enters in this field, the terminal including means for determining the distance separating the transponder from the terminal without requiring any transmission from the transponder to the terminal.

According to an embodiment of the present invention, the terminal includes an oscillating circuit adapted to receive a high frequency A.C. excitation voltage, said means measuring a variable depending on the load formed by the transponder on the terminal's oscillating circuit.

According to an embodiment of the present invention, said means measure the current in the oscillating circuit or the voltage across one or several of its elements.

According to an embodiment of the present invention, the terminal includes means for regulating the phase of the signal in the oscillating circuit with respect to a reference value.

According to an embodiment of the present invention, said measurement means include an analog-to-digital converter of the measured current or voltage and a digital circuit for comparing the measured value with a correspondence table stored in the terminal.

The foregoing objects, features and advantages of the present invention, will be discussed in detail in the following non-limiting description of specific embodiments in connection with the accompanying drawings.

DETAILED DESCRIPTION

Figure 1:
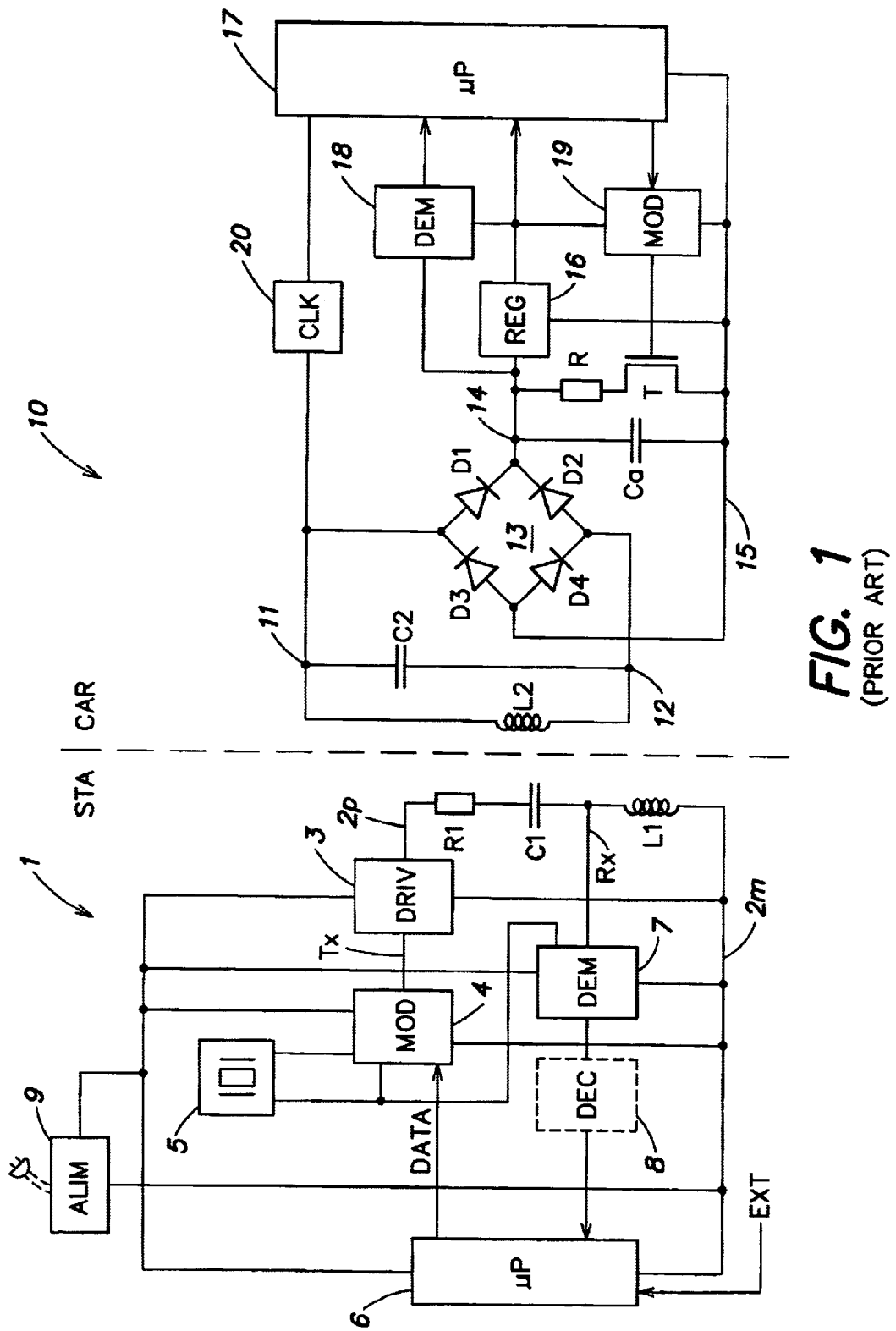
FIGS. 1 to 3, previously described, are intended for showing the state of the art and the problem to solve.
Figure 2:
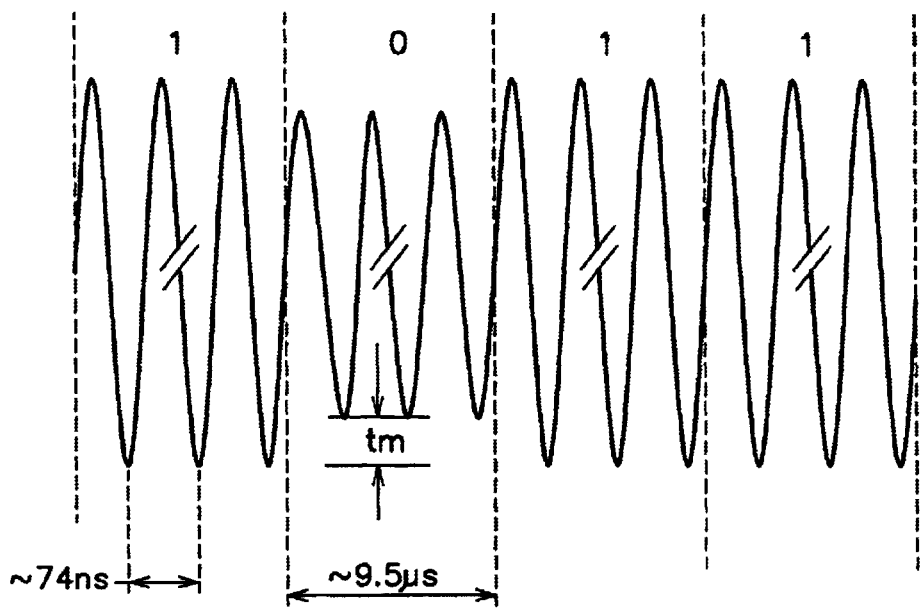
Figure 3:
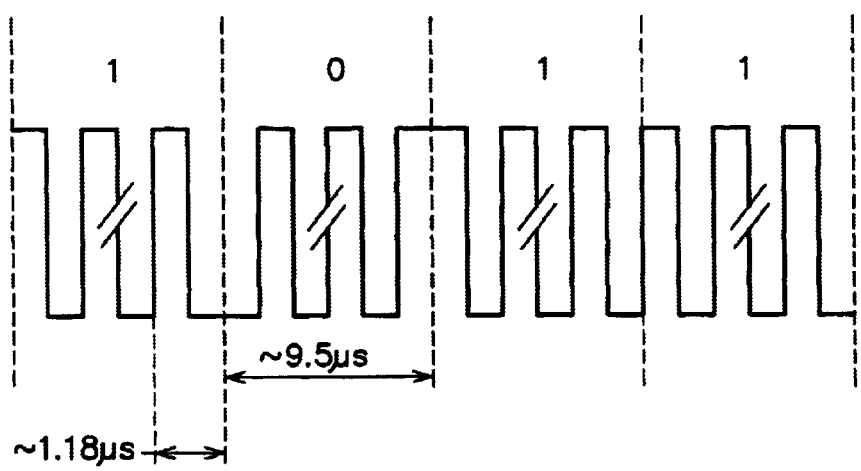

The same elements have been referred to with the same references in the different drawings and the drawings are out of scale. For clarity, only those elements necessary to the understanding of the present invention have been shown in the drawings and will be described hereafter. In particular, the structure of a transponder and the structure of the digital data processing elements on the read terminal side have not been detailed.

A feature of the present invention is to use the signal at the carrier frequency to detect the distance of a transponder that has entered the terminal field. The fact of using the information directly on the carrier (for example, at 13.56 MHz) enables determining the distance without requiring any information transmission from the transponder itself. Indeed, when it enters the field of a terminal, a transponder acts upon the load of the oscillating circuit of this terminal. This load variation depends, in particular, on the distance separating the transponder from the terminal.

A first solution would be to measure the signal amplitude (for example, the amplitude of the voltage across capacitor C1, FIG. 1) to determine the distance based on the variations of this voltage. Such a measurement is however unexploitable in practice, especially since the voltage variation range according to distance depends on the tuning of the oscillating circuit, and thus on the value of capacitance C1. Now, in conventional circuits, the tuning is never perfect.

In particular, in conventional terminals, the tuning of the resonance frequency at the carrier frequency is performed manually by means of a variable capacitor, once the terminal has been manufactured. The tuning needs adjusting, especially due to manufacturing tolerances of the capacitive and inductive elements, to guarantee the chosen phase operating point between the signal provided by oscillator 5 and the received signal Rx. A detuning of the terminal's oscillating circuit has several consequences and, in particular, that of modifying the signal amplitude in this oscillating circuit and, accordingly, the available amplitude of the signal for a possible measurement.

Thus, another feature of the present invention is to provide a regulation of the phase of the terminal's oscillating circuit with respect to a reference value. According to the present invention, this phase regulation is performed by means of a loop, the response time of which is chosen so that the loop is sufficiently slow to avoid disturbing the back modulation coming from a transponder and is sufficiently fast as compared to the displacement speed of a transponder in the terminal's field. This can be called a static regulation with respect to the modulation frequencies (for example, 13.56 MHz and 847.5 kHz).

Figure 4:
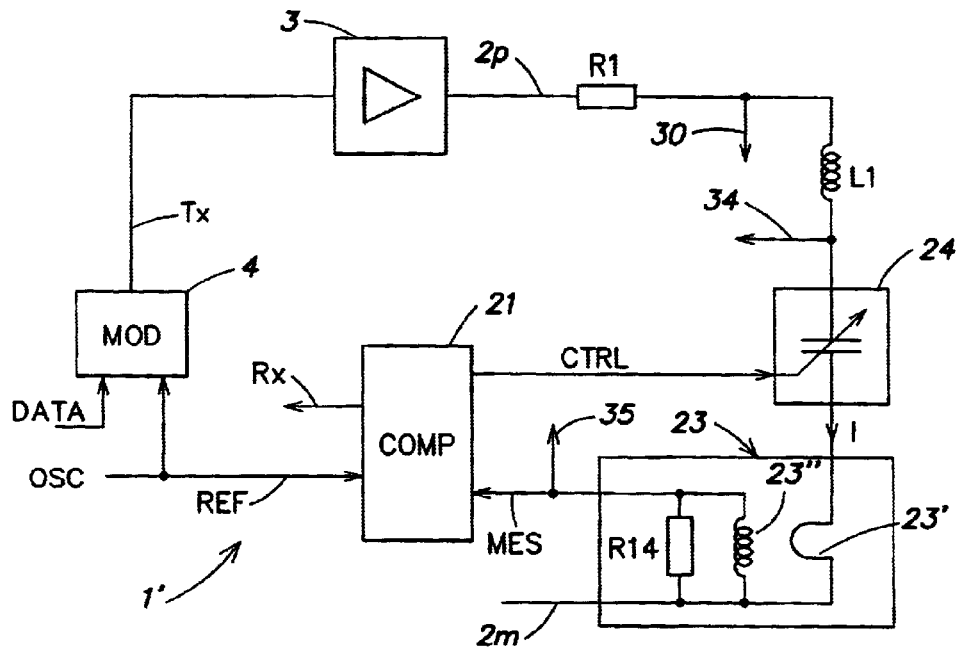
FIG. 4 shows, in block diagram form, an embodiment of a terminal of an electromagnetic transponder system according to the present invention.

FIG. 4 shows, in block diagram form, an embodiment of a terminal 1' according to the present invention provided with a phase regulation loop for the oscillating circuit.

As previously, terminal 1' includes an oscillating circuit formed of an inductance or antenna L1, in series with a capacitive element 24 and a resistor R1, between an output terminal 2p of an amplifier or antenna coupler 3 and a terminal 2m at a reference potential (generally the ground). Amplifier 3 receives a high frequency reference signal Tx from a modulator 4 (MOD) that receives a reference frequency (signal OSC), for example, from a quartz oscillator (not shown). Modulator 4 receives, if necessary, a data signal to be transmitted and, in the absence of any data transmission from the terminal, it provides the high frequency carrier (for example, 13.56 MHz) adapted to remotely supply a transponder.

A feature of the present invention is that capacitive element 24 is an element of variable capacitance, controllable by a signal CTRL.

According to the present invention, a regulation of the current phase in antenna L1 with respect to a reference signal REF is performed. This regulation is a regulation of the high frequency signal, that is, of the signal of the carrier (for example, at 13.56 MHz) corresponding to signal Tx in the absence of data to be transmitted. This regulation is performed by varying the capacitance of the oscillating circuit of terminal 1' so as to maintain the current in the antenna in constant phase relation with the reference signal. Signal REF is at the carrier frequency and corresponds, for example, to signal OSC provided by the oscillator (5, FIG. 1) of the modulator.

As illustrated in FIG. 4, capacitive element 24 provided in series with resistor R1 and inductance L1 is controllable by means of signal CTRL. Signal CTRL originates from a circuit 21 (COMP), the function of which is to detect the phase interval with respect to reference signal REF and to accordingly modify the capacitance of element 24.

Variable capacitor 24 may be formed in several ways. Generally, this capacitance must reach a few hundreds of picofarads and withstand, across its terminals, a voltage of more than 100 volts.

A first solution is to use a diode in which the capacitance of the reverse-biased junction is used as a variable capacitance that depends on this biasing. The diode is then connected, by its anode, on the side of reference terminal 2m and by its cathode, on the side of inductance L1.

A second solution is to use a diode-mounted MOSFET transistor. Such a component has substantially the same capacitance-voltage characteristic as that of a diode. The advantage is that, for a same avalanche breakdown voltage, the necessary integration surface is smaller than for a diode.

The phase measurement in the oscillating circuit is performed, for example, from a measurement of the current 1 through this oscillating circuit. A circuit 23 for of a current transformer connected in series with element 24 and inductance L1 is used, for example, in the embodiment illustrated in FIG. 4. Such a current transformer is generally formed of a primary winding 23' between element 24 and ground terminal 2m and of a secondary winding 23", a first terminal of which is directly connected to ground 2m and the other terminal of which provides a signal MES providing the result of the measurement, a current-to-voltage converting resistor R14 being connected in parallel with secondary winding 23".

The result MES of the measurement is sent to phase comparator 21 that then compares the phase of the current measured by block 23 with reference signal REF, and accordingly controls capacitive element 24 by means of signal CTRL.

According to a preferred embodiment, comparator 21 uses the same phase demodulator (not shown) as that used to demodulate the signal coming from the transponder and which may be received by the oscillating circuit. Accordingly, as illustrated in FIG. 4, comparator 21 provides signal Rx restoring a possible back modulation received from a transponder.

It should be noted that the phase regulation loop must be sufficiently slow so as not to disturb the phase modulation at 847.5 kHz, but sufficiently fast as compared to the displacement speed of a transponder in the terminal field, which is generally the displacement speed of a hand. For example, a response time on the order of one millisecond is adequate, the displacement time of a transponder being of several hundreds of milliseconds.

An advantage of the present invention is that by regulating the phase of the oscillating circuit on a reference value, possible problems of tolerance of the sizing of the oscillating circuit components and the drift of these components in operation are altogether avoided.

The fact of regulating the phase of the oscillating circuit on a reference value enables that the distance variation of a transponder entering the field of the terminal only translates as a modification of the real part of the impedance of this oscillating circuit. Indeed, all variations that would tend to modify the imaginary part of this impedance by the load formed by the transponder are compensated by the phase regulation loop.

It may be assumed that, when a transponder enters the field of a read/write terminal, the impedance of the terminal's oscillating circuit then depends not only on the values of components R1, L1 and on the capacitance of element 24 (referred to as C1), but also on the respective values of inductance L2 and of capacitor C2 (FIG. 1) of the transponder and of the equivalent resistance of the circuits (microprocessor, etc.) and on the back modulation means (for example, resistor R, FIG. 1), added in parallel on capacitor C2 and on inductance L2. This equivalent resistance will be designated hereafter as R2.

The apparent impedance of the terminal's oscillating circuit can be expressed as: $Z1=R1a+jX1a$, where $R1a$ and $X1a$ respectively represent the real and imaginary parts of the apparent impedance.

Imaginary part $X1a$ can express as $X1a=X1-a^2X2$, where $X1=\omega L1-1/\omega C1$, where $X2=\omega L2-1/\omega C2$, and where $a2$ is a term depending on pulse $\omega$, on the mutual inductance between the two oscillating circuits, on X2 and on a term R'2 based on L2/R2C2.

Real part $R1a$ can express as $R1a=R1+R1+a^2R'2$, where R1 represents the parasitic resistance of inductance L1.

By the phase control by means of the regulation system, it is ascertained that, in static operation (that is, for frequencies lower than the sub-carrier frequency), imaginary part $X1a$ is zero, that is, $X1=a^2X2$.

Further, for a given operating condition, characterized by the transponder load, that is, a given value for resistance R2, it may be assumed that the impedance only depends on the mutual inductance. Indeed, not only does pulse co remain constant, but also the values of resistances R1 and R1, of inductance L2 and of capacitance C2, that is, all the other parameters conditioning term $a^2$, can be considered as constant. Their possible variations are due to possible technological drifts and are negligible as compared to the variation due to resistor R2 reduced to the primary (=R'2) and that is conditioned by the load formed by the transponder in the field. As a result, for this given operating condition, the only remaining variable in term $a^2$ is mutual inductance m. Now, this mutual inductance is a function of the distance between the terminal and the transponder. Accordingly, an information that is a function of the distance separating the transponder from the terminal may be deduced from a variation of the impedance, and, more specifically, of the real part of this impedance.

It should be noted that, due to the presence of the phase loop, the impedance variation is monotonic according to distance and the variation range is always the same, whether circuit is tuned on the carrier frequency or detuned with respect to this distance.

Extracting the information on the impedance of the oscillating circuits can be performed in several ways. According to the present invention, it will be preferred to sample this information in the form of a voltage or current measurement, as will be described hereafter in relation with three embodiments illustrated in FIGS. 5, 7 and 9. These embodiments provide sampling the information, respectively, at nodes 30, 34, and 35 of FIG. 4.

Figure 5:
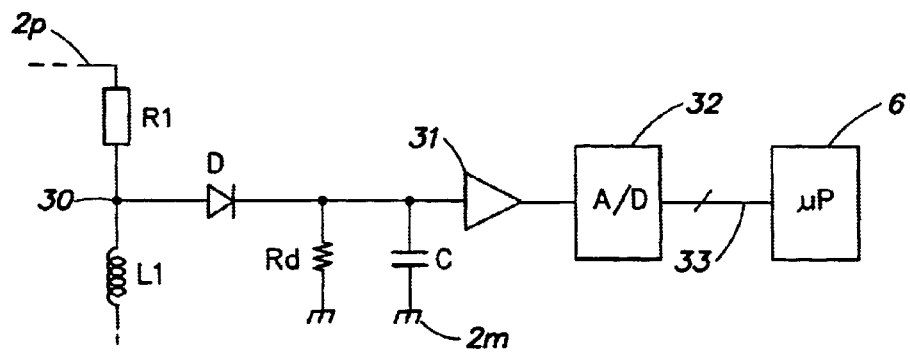
FIG. 5 partially and very schematically shows a first embodiment of a distance detector according to the present invention.

FIG. 5 shows a first embodiment of a distance detector according to the present invention. According to this embodiment, the voltage is measured across the oscillating circuit, more specifically between the junction point 30 of serially-connected resistor R1 and inductance L1, and the ground (2m). The measurement device used includes, for example, a capacitor C for storing the voltage measured at node 30. A first terminal of capacitor C is connected, via a diode D, to node 30, while its second terminal is connected to ground 2m. The function of diode D is to rectify the signal sampled on terminal 30. A resistor Rd is placed in parallel on capacitor C to discharge the capacitor when the measured value decreases. Diode D, capacitor C and resistor Rd form an envelope detector and other means for forming such a detector may be used. The voltage stored in capacitor C may be amplified by an amplifier 31 before being exploited by an analog-to-digital converter (A/D) 32, the outputs 33 of which are sent to processor 6 of the terminal. Amplifier 31, the input of which is connected to the junction point of serially-connected diode D and capacitor C and the output of which is sent to converter 32 only has the function of amplifying, if necessary, the amplitude of the measurement signal variations, according to the variation range that is desired to be measured.

Figure 6:
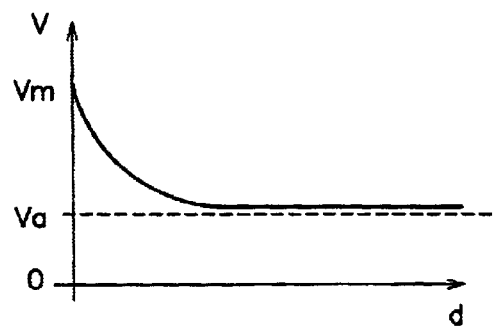
FIG. 6 illustrates by a voltage-distance characteristic the operation of the detector of FIG. 5.

As illustrated in FIG. 6, which shows an example of a voltage-distance characteristic according to the first embodiment of FIG. 5, voltage V across capacitor C decreases as the distance between the terminal and the transponder increases. Voltage V is maximum (Vm) for a null distance and linearly decreases to reach an asymptote (voltage Va), which corresponds to the measured voltage in the absence of a transponder in the terminal's field. In practice, voltage Va is close to zero.

Figure 7:
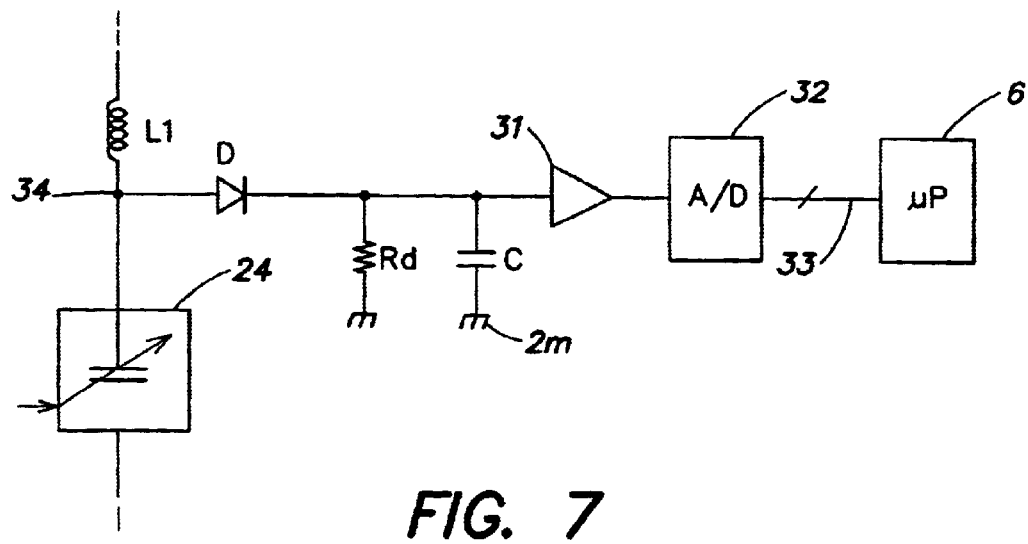
FIG. 7 partially and very schematically shows a second embodiment of a distance detector according to the present invention.

FIG. 7 shows a second embodiment of a distance detector according to the present invention. According to this embodiment, the voltage is measured across capacitive element 24, more specifically between the junction point 34 of inductance L1 and element 24, and ground 2m. This measurement is performed by means of a device similar to that used in FIG. 5, that is, including a diode D between node 34 and a first terminal of a capacitor C, the second terminal of which is grounded, a resistor Rd being arranged in parallel on capacitor C. The voltage across capacitor C is measured, if necessary via an amplifier 31, by an analog-to-digital converter 32, the outputs 33 of which are exploited by processor 6.

Figure 8:
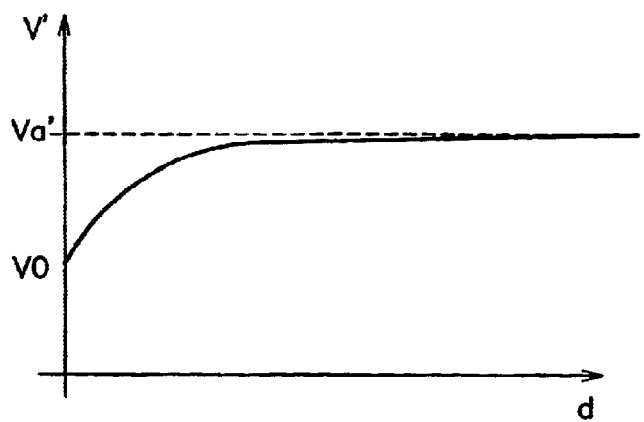
FIG. 8 illustrates by a voltage-distance characteristic the operation of the detector of FIG. 7.

FIG. 8 illustrates the shape of voltage V' across capacitor C according to the distance between the terminal and the transponder. Voltage V' has the inverse shape of voltage V of FIG. 6, that is, it non-linearly increases from a minimum value V0 to an asymptotic value Va' corresponding to the absence of any transponder in the terminal's field.

Figure 9:
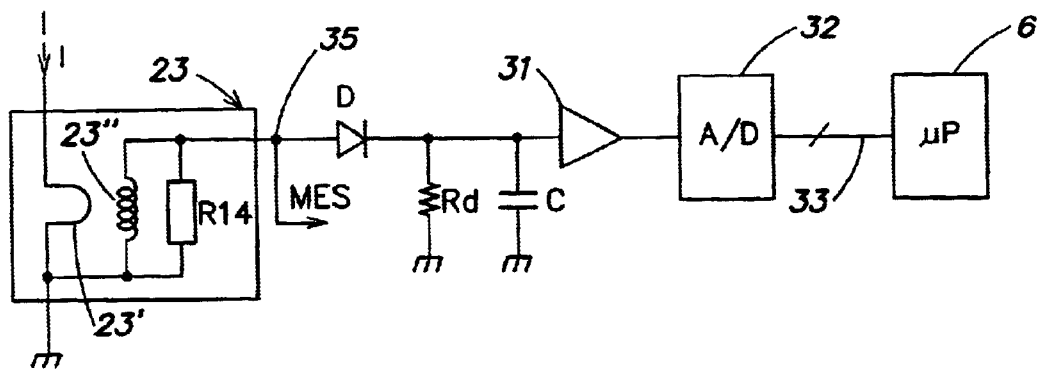
FIG. 9 partially and very schematically shows a third embodiment of a distance detector according to the present invention.

FIG. 9 shows a third embodiment of a distance detector according to the present invention. According to this embodiment, the current is measured in the terminal's oscillating circuit. This measurement is preferably performed by means of current measurement device 23, further used for the phase regulation. Thus, as illustrated in FIG. 9, the current measurement is performed via the same current transformer. Terminal 35 of resistor R14, which provides in FIG. 4 measurement signal MES to phase comparator 21, is connected to the anode of a diode D of the measurement device according to the present invention. As in the other embodiments, the cathode of diode D is connected to a first terminal of a capacitor C, the other terminal of which is grounded, a resistor Rd being in parallel with capacitor C. The cathode of diode D is also connected, if necessary via an amplifier 31, to an input terminal of an analog-to-digital converter 32, the outputs 33 of which are exploited by processor 6.

Figure 10:
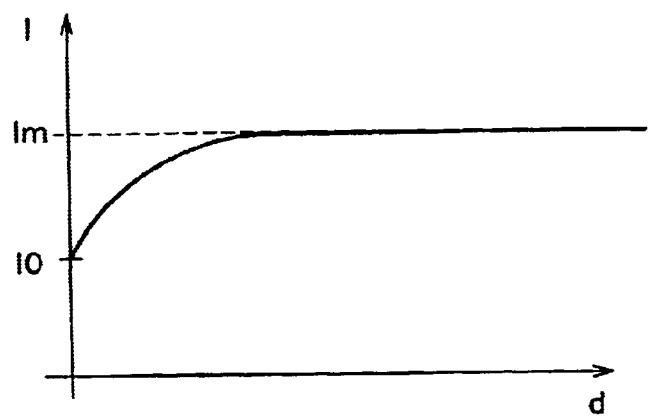
FIG. 10 illustrates by a voltage-distance characteristic the operation of the detector of FIG. 9.

FIG. 10 illustrates the shape of current I in the oscillating circuit according to distance. Current I increases from a minimum value I0 to an asymptote Im corresponding to the state of the oscillating circuit in the absence of any transponder in its field.

It should be noted that, whatever the embodiment used, the distance variation translates as the modification of the real part of the impedance of the oscillating circuit of the primary. In this impedance, as discussed previously, the contribution of resistance R1 and of the parasitic resistance of the self-inductance can be considered as constant according to distance. More specifically, their variations are negligible and are essentially due to technological dispersions. Accordingly, only the mutual inductance and possible resistance R2 brought from the transponder vary. For resistance R2, it should be noted that in most cases, its variation in case of a back modulation is negligible. If such is not the case, it is sufficient to size capacitor C so that the envelope detector (diode D, capacitor C, resistor Rd) is insensitive to the sub-carrier frequency, or to detect the back modulation.

Among the embodiments described hereabove, the current measurement is a preferred embodiment, since this current is never zero, whether or not there is a transponder in the terminal's field.

It should be noted that, as an alternative, a voltage measurement may be combined with a current measurement. For example, the current will be used as a main measurement and, if the current value asymptote at which it becomes difficult to exploit the measurement is reached, a voltage measurement is then used to validate or invalidate the presence of a transponder in the terminal's field and, accordingly, the distance measurement performed.

An advantage of the present invention is that it is not necessary that the transponder transmits to determine the distance separating it from the terminal. Indeed, the present invention determines the distance only based on the load formed by the transponder on the oscillating circuit and without requiring demodulation of a message transmitted by said transponder.

It should be noted that the transformation of the voltage or current information into a value based on a correspondence table stored in the terminal is within the abilities of those skilled in the art based on the functional indications given hereabove. In establishing the table, the voltage amplitudes and of the range of voltage or current variation according to distance will of course be taken into account.

Another advantage of the present invention is that the distance measurement is performed on the single permanent signal of the transmission system, that is, the remote supply carrier (for example, at 13.56 MHz).

Of course, the present invention is likely to have various alterations, modifications, and improvements which will readily occur to those skilled in the art. In particular, the choice of the information used for the measurement depends on the application and, in particular, on the sizing of the different components of the oscillating circuits that condition the amplitude of the voltage or current variation according to distance. Further, the practical implementation of the measurement and phase regulation circuits is within the abilities of those skilled in the art based on the functional indications given hereabove.

Among the applications of the present invention, contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.) will more particularly be pointed out.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating an electromagnetic field adapted to cooperate with at least one transponder when said transponder enters in the field, and comprising an oscillating circuit adapted to receive a high frequency A.C. drive voltage, the terminal including means for determining a distance separating the transponder from the terminal without requiring any transmission from the transponder to the terminal and means for regulating a phase of a signal in the oscillating circuit with respect to a reference value.

2. The terminal of claim 1, wherein said means for determining a distance measure a variable depending on a load formed by the transponder on the terminal's oscillating circuit.

3. The terminal of claim 2, wherein said means for determining the distance measure a current in the oscillating circuit or a voltage across one or several of its elements.

4. The terminal of claim 3, wherein said means for determining the distance include an analog-to-digital converter of a measured current or voltage and a digital circuit for comparing the measured current or voltage with a correspondence table stored in the terminal.

5. A terminal that generates an electromagnetic field, the terminal being adapted to communicate with a transponder when the transponder enters the electromagnetic field, the terminal comprising:
    an oscillating circuit;
    a phase-regulation loop that regulates a phase of a signal in the oscillating circuit with respect to a reference value; and
    a distance detector that determines a distance between the terminal and the transponder based on a value of a real part of an impedance of the oscillating circuit.

6. The terminal of claim 5, wherein the signal is a current in the oscillating circuit.

7. The terminal of claim 6, wherein the phase-regulation loop includes a phase comparator that provides an output signal based on a comparison of a measured value of the phase of the current with the reference value.

8. The terminal of claim 7, wherein the phase comparator uses the output signal to vary a capacitance of the oscillating circuit to regulate the phase of the current.

9. The terminal of claim 5, wherein the distance detector includes an envelope detector that measures a voltage at a node of the oscillating circuit to provide a measured voltage indicative of the real part of the impedance of the oscillating circuit.

10. The terminal of claim 9, wherein the envelope detector includes a capacitor for storing the measured voltage, a resistor that discharges the capacitor when the measured voltage decreases, and a diode that rectifies the voltage at the node.

11. The terminal of claim 9, wherein the distance detector includes an analog-to-digital converter that converts the measured voltage to a digital value, and provides the digital value to a processor.

12. The terminal of claim 5, wherein the distance detector includes a current measurement device that measures a current in the oscillating circuit.

13. A method for determining a distance between a terminal that generates an electromagnetic field, the terminal being adapted to communicate with a transponder when the transponder enters the electromagnetic field, and the transponder that enters the electromagnetic field, independent of the transponder transmitting any signal, the method comprising acts of:
    regulating a phase of a current in an oscillating circuit of the terminal;
    determining a value of a real part of an impedance of the oscillating circuit; and
    determining the distance between the terminal and the transponder based on the value of the real part of the impedance of the oscillating circuit.

14. The method of claim 13, wherein the act of regulating includes:
    measuring the phase of the current to provide a measured phase;
    comparing the measured phase with a reference value; and
    regulating the phase of the current with respect to the reference value.

15. The method of claim 14, wherein the act of regulating further includes an act of varying a capacitance of the oscillating circuit.

16. The method of claim 13, wherein the act of determining the value of the real part of the impedance includes measuring a voltage at a node of the oscillating circuit to provide a measured voltage.

17. The method of claim 16, wherein the act of determining the distance includes comparing the measured voltage with a predetermined value.

18. The method of claim 13, wherein the act of determining the distance includes converting the measured voltage to a digital value.

19. The method of claim 13, wherein the act of determining the value of the real part of the impedance includes measuring a voltage at a node of the oscillating circuit to provide a measured voltage.

20. The method of claim 13, wherein the act of determining a value of a real part of an impedance of the oscillating circuit includes measuring a current in the oscillating circuit.

* * * * *

UNITED STATES PATENT AND TRADEMARK OFFICE
CERTIFICATE OF CORRECTION

PATENT NO. : 6,650,226 B1
DATED : November 18, 2003
INVENTOR(S) : Luc Wuidart, Michel Bardouillet and Jean-Pierre Enguent It is certified that error appears in the above-identified patent and that said Letters Patent is hereby corrected as shown below:

<u>Title page,</u>
Item [30], should read:
-- [30] Foreign Application Priority Data
Apr. 7, 1999 (FR) …………..99 04545
Apr. 7, 1999 (FR) …………..99 04548
May 31, 1999 (FR) ………....99 07024 --

Signed and Sealed this

Sixteenth Day of March, 2004

JON W. DUDAS
*Acting Director of the United States Patent and Trademark Office*